July 15, 1969    J. B. GODSHALK    3,456,181
AUXILIARY BATTERY CONNECTING APPARATUS
Filed April 5, 1967    2 Sheets-Sheet 2
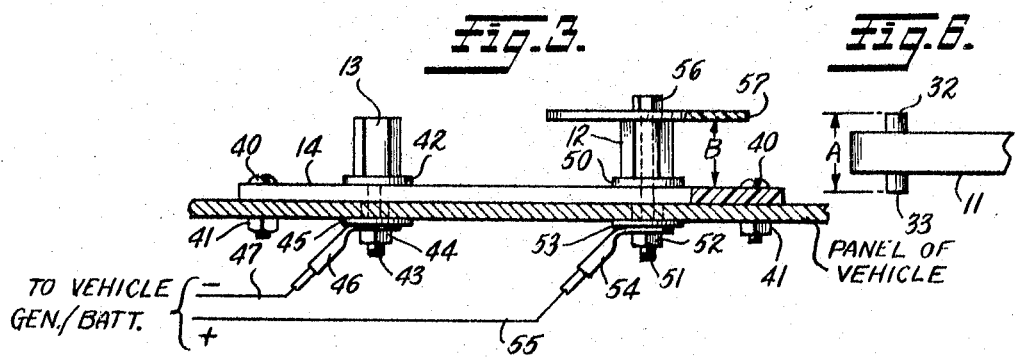
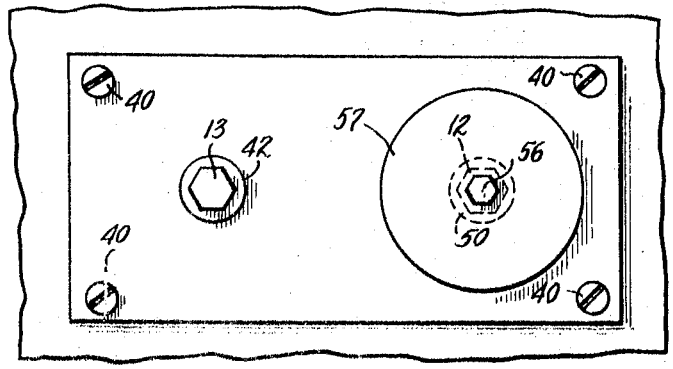
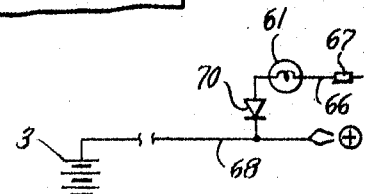
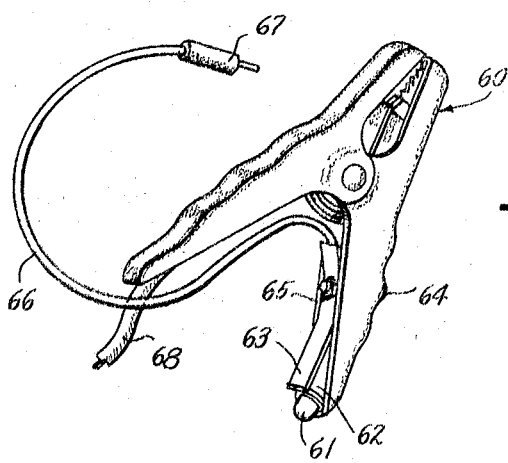
INVENTOR
JAMES B. GODSHALK
BY Arnold, Roylance, Kruger & Durkee
ATTORNEYS

United States Patent Office 3,456,181
Patented July 15, 1969

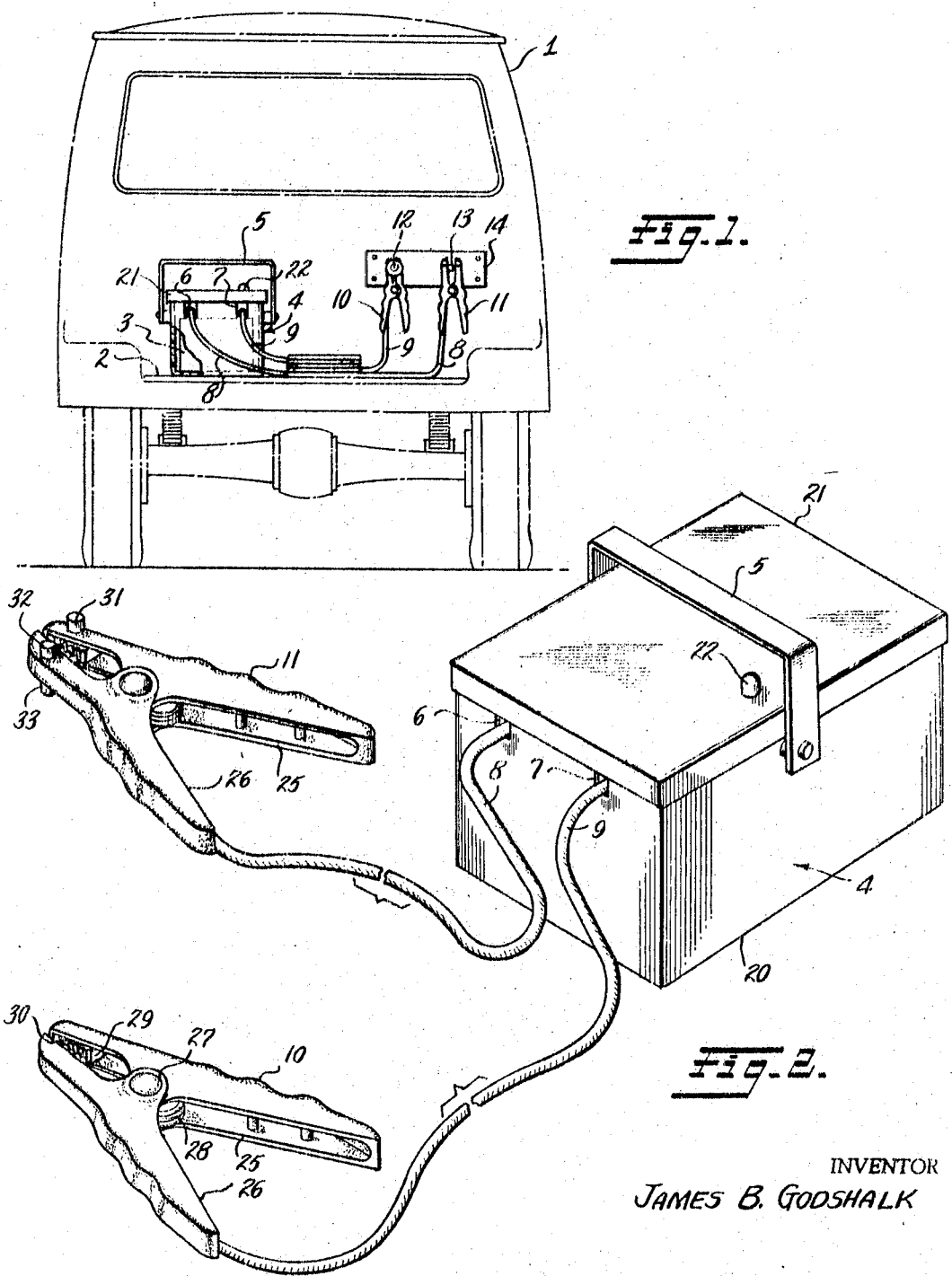

3,456,181
AUXILIARY BATTERY CONNECTING APPARATUS
James B. Godshalk, Yardley, Pa., assignor to Fox Products Company, Philadelphia, Pa., a corporation of Pennsylvania
Filed Apr. 5, 1967, Ser. No. 628,698
Int. Cl. H01m 45/04; H02j 7/00; H01r 13/64
U.S. Cl. 320—25                          7 Claims

ABSTRACT OF THE DISCLOSURE

Terminal posts are mounted on an insulating panel attached to a service vehicle body and electrically connected to the service vehicle electrical system. An insulating plate is attached to the distal end of one post. A battery clamp, connected by a cable to one terminal of an auxiliary battery, is provided with ears which occupy a span greater than the distance between the plate and the panel so that the clamp having the ears can be connected only to the other post. Another clamp is connected by another cable to the other terminal of the battery. The battery is contained within a portable insulating box having a lid with a hydrometer mounted therein. A light is provided to indicate proper polarity when the clamps are being connected to the battery of a stalled vehicle.

---

This invention relates to auxiliary power apparatus and more specifically, to portable auxiliary booster battery apparatus and charging means therefor.

It is common practice, especially in cold climates during the winter, for automotive service stations to maintain a service vehicle equipped with a pair of cables having heavy clips attached thereto for starting stalled vehicles rendered temporarily unusable by a defective or discharged battery which has insufficient energy to start the engine. To start the stalled vehicle the batteries of the service vehicle are connected in parallel by the cables while operating the starter of the stalled car.

Frequently the stalled vehicle is in a location such that the cables are not long enough to reach between it and the service vehicle. Providing extremely long cables is impractical because of their clumsiness and because of the increased voltage drop.

For these circumstances, the service truck can be provided with an extra battery which can be carried to the stalled vehicle. However, this extra battery can only be used for one or two starts before it is discharged to an unusable level. Also, where the temperature is low the efficiency of the extra battery is further diminished. Thus, after one or two service calls the auxiliary battery may be so useless that it must be returned to the service station for recharging. This is a considerable disadvantage, especially where the service truck is radio dispatched and can be expected to make a dozen or more such calls on a single trip away from the service station.

Also, it is difficult to manually transport a rather heavy battery for any signficant distance, and a danger exists of acid spilling on the service vehicle operator as the battery is being carried because of the vent holes in the battery filler caps.

One object of this invention is to provide means for recharging an auxiliary battery carried on a service vehicle between points of use.

Another object is to provide an apparatus connected to the electrical system of a service vehicle and to which an auxiliary battery can be connected for recharging from the service vehicle generator.

A further object is to provide an apparatus connected to the electrical system of a service vehicle and to which an auxiliary battery can be connected for recharging between points of use, the apparatus being provided with mechanical means to prevent connection of the auxiliary battery with improper polarity for charging.

Yet another object is to provide an apparatus as above which is simple and inexpensive and which can be used by one having minimal skill.

A still further object is to provide an apparatus for containing and transporting an auxiliary battery in a safe and convenient manner to and from a service vehicle.

Another object is to provide means for connecting a portable auxiliary battery to a source of charging current wherein the connection can be made only with the proper polarity for charging the battery.

The invention includes two electrically conductive projections protruding from a surface of a service vehicle. At least one of the projections is electrically insulated from the vehicle body and is connected to the vehicle electrical system. An electrically nonconductive plate is secured to the distal end of one of the projections a predetermined distance from the surface of the vehicle.

An auxiliary battery is carried within a container made of electrically insulating material which is normally carried aboard the service vehicle. One end of each of two cables is connected to a terminal post of the auxiliary battery. The other ends of the two cables are provided with clamps which are connectable to the projections, one of the clamps being provided with means which would interfere with the plate secured to one of the projections, thus permitting that clamp to be electrically connected to only one of the projections, thereby defining a particular polarity relationship between the auxiliary battery and the vehicle electrical system through successive disconnections and reconnections.

In order that the manner in which the foregoing and other objects are attained in accordance with the invention can be understood in detail, a particularly advantageous embodiment thereof will be described with reference to the accompanying drawings which form a part of this specification, and wherein:

FIG. 1 is a rear elevation of one type of service vehicle showing one placement of the apparatus of the invention;

FIG. 2 is a perspective of a container for an auxiliary battery with cables attached to the battery;

FIG. 3 is an elevation of vehicle-mounted terminal posts constructed in accordance with the invention;

FIG. 4 is a plan view of the apparatus of FIG. 3;

FIG. 5 is a detail drawing of one embodiment of a clamp;

FIG. 6 is a side view of the jaw portion of a clamp constructed in accordance with the invention; and FIG. 7 is a schematic diagram of a polarity checking circuit usable with the clamp of FIG. 5.

Referring now to FIG. 1, a service vehicle 1 includes a suitable area in which an auxiliary battery can be carried. In FIG. 1, the service vehicle is a truck having a flat bed 2. It will be recognized that many types of vehicles can be used, and that the particular truck illustrated forms no part of the present invention. An auxiliary battery 3 is carried on bed 2 within a portable case 4 having a handle 5 to allow an operator to remove the case from the truck and transport it manually to the location of a disabled vehicle. The case is provided with openings 6 and 7 through which a cable 8 and a cable 9 can pass, one end of each of the cables being connected to one of the terminal posts of the battery in the usual manner. The other end of each cable is connected to the electrically conductive portion of one of clamps 10 and 11. Clamps 10 and 11 are designed to be connectable to the terminal posts of the battery of a disabled vehicle, or to other convenient points in the electrical system at and during a service call. Between calls, the clamps are intended to be connected to electrically conductive posts 12 and 13 which are mounted on a panel 14.

It will be recognized that panel 14 can be electrically nonconductive, but that it need not be. The panel can be eliminated entirely, but this is not considered desirable because of the consequent damage to the vehicle paint as the clamps are repeatedly attached to and removed from posts attached directly to the vehicle body. Panel 14 is securely fastened to a convenient surface of vehicle 1. Posts 12 and 13 are electrically connected to the battery-generator system of vehicle 1.

The arrangement of the case and the structure of the clamps can be more clearly seen in FIG. 2 in which the case, cables and clamps are identified by the same reference numerals used in FIG. 1. As will be seen in FIG. 2, case 4 includes a main body portion 20 which is constructed of a relatively rigid plastic, or sheet metal coated with an electrically nonconductive acid resistance material such as polyvinyl chloride or the like. Handle 5 is pivotally attached to body portion 20 so that the case can be easily lifted and carried by a user. Openings 6 and 7 are U-shaped and are at the upper edge of one side of case 20 to allow the cables to pass from the terminals of an auxiliary battery contained within the case to the clamps. A lid 21 is placed over the opening in the case, the lid being constructed in the same manner as the case using an acid resistance electrically nonconductive material. A conventional pith ball hydrometer 22 is mounted in lid 21 in a suitable location to protrude downwardly into a cell of the battery to provide a continuous indication of the density of the electrolyte in the battery and, hence, the battery's state of charge.

Cables 8 and 9 are connected to clamps 10 and 11. Clamp 10 includes electrically nonconductive body portions 25 and 26, each of which forms one handle and the outer portion of one jaw of the clamp. Inwardly extending projections on body portions 25 and 26 are dimensioned to overlap near the midpoint of the body portions, each being provided with an opening through which a hinge pin 27 extends. A coil spring 28 surrounds each hinge pin and is secured to the body portions to urge the handle sections away from each other, and hence, the jaw portions toward each other. The jaw end of each body portion contains an electrically conductive insert, these being identified in FIG. 2 as 29 and 30. The inner surface of inserts 29 and 30 are serrated to provide good gripping surfaces. Cable 9 is electrically connected to insert 30 within body member 26.

Clamp 11 is constructed in a manner similar to clamp 10 but with the addition of laterally extending projections 31, 32, 33 and 34, only projections 31-33 being visible in FIG. 2. Projections 31-34 are made of a rigid electrically nonconductive material and are firmly secured to the jaw portions of clamp 11. It will be recognized that the projections from either jaw can constitute a single member passing entirely through the jaw. Thus, projections 32 and 33 can be opposite ends of a single cylindrical member passing through the jaw and through or past the electrically conductive insert therein.

It is to be noted that the clamps can be constructed with only projections 31 and 32, these projections being longer than if projections are provided on both sides.

The panel and post assembly to which the cables can be connected is shown in greater detail in FIG. 3. Electrically nonconductive plate 14 is firmly secured to a convenient panel of vehicle 1 by any conventional means such as machine screws 40 and nuts 41. Posts 12 and 13 are advantageously hexagonal cylindrical bodies as shown in FIG. 3. Post 13 is provided with a laterally extending flange 42 which contacts the outer face of plate 14. Plate 14 and the vehicle panel are provided with openings through which an externally threaded extension 43 of post 13 passes. The post is held to the vehicle and insulating panels by a nut 44 which also grips an insulating washer 45 and a terminal member 46. Terminal 46 is adapted to make good electrical contact with post 13 and is electrically connected to a conductor 47 which is connected to one electrical side of the vehicle generator-battery system.

Post 12 is likewise provided with a flange 50 and an externally threaded extension 51 which extends through openings in the insulating plate and the vehicle panel, and is held in place by a nut 52. Nut 52 also grips an insulating washer 53 and a terminal 54 which is electrically connected to a conductor 55. Conductor 55 is connected to the other side of the vehicle electrical system.

The distal end of post 12 is internally threaded to receive the externally threaded portion of a machine screw 56 having an enlarged head. The head of screw 56 holds an electrically nonconductive plate 57 firmly against the end of post 12 establishing an annular space having an axial dimension indicated by the letter B, between the outer surface of plate 14 and the inner surface of plate 57. As will be seen in FIG. 4, plate 57 extends parallel to the outer surface of plate 14 well beyond the peripheral limits of post 12, thereby preventing any body which is larger than the distance B from making contact with post 12.

FIG. 6 shows a detail of the jaw end of clamp 11 in which it can be seen that the total span between the ends of projections 32 and 33 is a distance A, this same span being occupied by projections 31 and 34. The distance A is greater than this distance B, thereby preventing clamp 11 from being closed around post 12 so that the electrically conductive inserts in clamp 11 cannot make electrical contact with post 12.

As described above, projections can be provided on only one side of the clamp jaws. In that arrangement, the length of these projections is increased so that the total span occupied by the jaw and the projections is still equal to the distance A.

When the apparatus is initially installed and connected, post 12 is initially connected to one side of the vehicle electrical system, the positive side having been chosen herein for purposes of illustration. When cable 8 is initially connected to the auxiliary battery, it is connected to the negative post of the battery. Thus, clamp 11 can be secured only to the negative side of the vehicle electrical system via post 13, clamp 10 being easily connectable to post 12 because it does not have the laterally extending projections. Thus, the operator need not test the connections of the clamps to the vehicle electrical system and is automatically assured that the connections are proper to charge the auxiliary battery while the vehicle is traveling from one call to the next.

It is also important when the operator connects the auxiliary battery to the electrical system of a stalled vehicle that the connections be proper to avoid discharging or damaging the auxiliary battery at a time when it is most needed. Provision can be therefore made to provide a simple polarity chacking apparatus on the clamps themselves. Such an apparatus is shown in FIG. 5 wherein a clamp 60, the basic structure of which is similar to that of clamp 10, additionally includes a lamp 61 which is mounted in a suitable socket 62, the lamp and socket assembly being held within a recess in one of the handles by a clamping strip 63 of relatively rigid insulating material and a fastener such as a bolt 64 and nut 65. One end of an electrical conductor 66 is connected to one side of lamp 61, the other end of the conductor being connected to a probe 67. At least one of the electrically conductive inserts in the jaws of clamp 60 are connected to a cable 68 as discussed with reference to FIGS. 1 and 2.

The electrical connections for the clamp and probe assembly of FIG. 5 are shown in FIG. 7. In FIG. 7, it will be seen that the other side of lamp 61 is connected to the anode of a semiconductor diode 70, the cathode of which is connected to cable 68. The electrically conductive portions of clamp 60 constitute the positive clamp, that is, the clamp which is to be connected to the positive side of the stalled vehicle electrical system. Cable 68 is connected to the positive side of the auxiliary battery 3, the negative terminal of battery 3 being connected to a negative clamp 71.

When the operator begins his connection of the auxiliary battery to the stalled vehicle battery, he connects clamp 71 to the negative post of that battery or to some convenient point on the negative side of the electrical system, and then, before connecting clamp 60 to the post, touches the conductive end of probe 67 to that post. If the polarity is proper, diode 70 will allow current to flow through the probe and through lamp 61, causing the lamp to light. If the connection is not proper, the lamp will not light and the operator knows that he must reverse the connections. When he is sure the polarity is correct, the jaw of clamp 60 are firmly attached to the positive post, and an effort can be made to start the stalled vehicle.

While one advantageous embodiment has been chosen to illustrate the invention, it will be understood by those skilled in the art that various changes and modifications can be made therein without departing from the scope of the invention as defined in the appended claims.

What is claimed is:

1. Polarity protection apparatus especially useful with an automotive service vehicle of the type having an electrical system including a storage battery and means for producing a DC battery charging current, and also having a suitable location for transporting an auxiliary storage battery and an accessible vehicle surface near the suitable location, the apparatus comprising the combination of
a first plate secured to the accessible surface;
an electrically conductive terminal post secured to said first plate and extending substantially perpendicularly from said plate,
said post being electrically connected to the charging current producing means in the vehicle electrical system;
a second plate secured to the distal end of said post,
said first and second plates being separated by a distance X;
an auxiliary storage battery having two terminals,
said battery being removably carried by the vehicle;
first and second electrical conductor means connected to said auxiliary battery for providing charging current to said battery when said battery is aboard the vehicle;
a clamp connected to an end of the first one of said conductor means, said clamp comprising
a pair of jaws having electrically conductive portions,
hinge means for pivotally connecting said jaws together,
spring means for normally urging said jaws toward a closed position, and
rigid projections extending laterally from at least one side of said jaws, the total span of said jaws and projections being greater than said distance X,
said laterally extending projections being located on said at least one jaw to interfere with said first and second plates and to prevent electrical connection of said clamp to said post.

2. Apparatus according to claim 1 and further comprising
a second clamp connected to an end of the second one of said conductor means, said clamp comprising
a pair of jaws having electrically conductive portions,
hinge means for pivotally connecting said jaws together, and
spring means for normally urging said jaws toward a closed position,
the lateral dimensions of at least a portion of said jaws of said second clamp being less than said distance X,
said second clamp being electrically connectable to said post.

3. Apparatus according to claim 1 wherein said projections extend laterally from both sides of said jaws of said clamp.

4. Apparatus according to claim 1 wherein said laterally extending projections are electrically nonconductive.

5. Apparatus according to claim 1 and further comprising
a second electrically conductive terminal post extending substantially perpendicularly from the vehicle surface,
said clamp being electrically connectable to said second post.

6. Apparatus for connecting a source of direct current having two terminals to a load having two terminals with a preselected polarity relationship comprising the combination of
a first terminal post;
a second terminal post;
first circuit means interconnecting said first terminal post and one terminal of the DC source;
first and second electrical conductors connected to the first and second terminals of the load, respectively;
first and second electrically nonconductive members secure to said first terminal post in spaced relationship to define an exposed electrically conductive portion of said first post having a critical dimension X;
first and second clamp means electrically connected to said first and second conductors,
said first clamp means being connectable to either of said first and second posts;
relatively rigid projection members carried by said second clamp means,
said projections being disposed to interfere with said first and second nonconductive members when an attempt is made to connect said second clamp means to said first post,
the exterior lateral dimension of said projections and jaws being greater than said dimension X,
whereby said second clamp means is connectable only to said second post.

7. Apparatus according to claim 6 wherein one of said first and second clamp means further comprises
an indicating lamp;
a third electrical conductor having one free end;
a semiconductor diode connected in series circuit relationship with said lamp between the other end of said third conductor and the one of said first and second conductors connected to said clamp.

References Cited

UNITED STATES PATENTS

| | | | |
|---|---|---|---|
| 1,981,210 | 11/1934 | Wheat | 320—2 |
| 2,483,673 | 10/1949 | Robinson et al. | 320—2 X |
| 3,002,175 | 9/1961 | Bertram et al. | 339—184 X |
| 3,039,075 | 6/1962 | Stollman | 339—184 |
| 3,149,898 | 9/1964 | Klumpp | 339—184 |
| 3,257,599 | 6/1966 | Somers et al. | 320—2 |
| 3,259,754 | 7/1966 | Matheson | 320—25 X |

JOHN F. COUCH, Primary Examiner

STANLEY WEINBERG, Assistant Examiner

U.S. Cl. X.R.

339—184